US008576844B1

(12) United States Patent
Ghosh (10) Patent No.: US 8,576,844 B1
(45) Date of Patent: Nov. 5, 2013

(54) FORWARDING MULTICAST PACKETS IN A VPLS ROUTER ON THE BASIS OF MAC ADDRESSES

(75) Inventor: Kaushik Ghosh, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 371 days.

(21) Appl. No.: 12/792,350

(22) Filed: Jun. 2, 2010

Related U.S. Application Data (60) Provisional application No. 61/325,104, filed on Apr. 16, 2010.

(51) Int. Cl.
*H04L 12/28* (2006.01)

(52) U.S. Cl.
USPC .......................................................... 370/390

(58) Field of Classification Search
USPC .......................................................... 370/390
See application file for complete search history.

(56) References Cited

U.S. PATENT DOCUMENTS

| | | | | |
|---|---|---|---|---|
| 7,106,736 | B2 * | 9/2006 | Kalkunte | 370/391 |
| 7,558,219 | B1 | 7/2009 | Aggarwal et al. | |
| 7,639,683 | B2 * | 12/2009 | Uchiyama et al. | 370/390 |
| 7,719,958 | B1 * | 5/2010 | Azimi et al. | 370/220 |
| 7,808,887 | B2 * | 10/2010 | Damm et al. | 370/216 |
| 7,835,276 | B2 * | 11/2010 | Naik et al. | 370/230 |
| 7,860,112 | B2 * | 12/2010 | Kompella | 370/400 |
| 8,125,926 | B1 * | 2/2012 | Kompella | 370/254 |
| 2003/0174706 | A1 * | 9/2003 | Shankar et al. | 370/393 |
| 2005/0111474 | A1 * | 5/2005 | Kobayashi | 370/432 |
| 2005/0169270 | A1 * | 8/2005 | Mutou et al. | 370/390 |
| 2008/0205397 | A1 | 8/2008 | Xu | |
| 2011/0200042 | A1 * | 8/2011 | Goli et al. | 370/390 |

OTHER PUBLICATIONS

Fenner et al., "Protocol Independent Multicast—Sparse Mode (PIM-SM): Protocol Specification (Revised)," IETF, RFC 4601, Aug. 2006, 151 pp.
Juniper Networks, "Virtual Private Lan Service (VPLS) Scalable Ethernet-Based Enterprise Connectivity and Broadband Delivery," Oct. 2007, 2 pp.
Banikazemi, M., "IP Multicasting: Concepts, Althorithms, and Protocols," Feb. 7, 2000, 3 pp.
Christensen et al., "Considerations for Internet Group Management Protocol (IGMP) and Multicast Listener Discovery (MLD) Snooping Switches," IETF, RFC 4541, May 2006, 17 pp.
Kamite et al., "Requirements for Multicast Support in Virtual Private LAN Services," IETF, Internet-Draft, Jun. 27, 2005, 27 pp.
Hemige et al., "PIM Snooping over VPLS," IETF, draft-ietf-l2vpn-vpls-pim-snooping-01.txt, Mar. 2007, 38 pp.

* cited by examiner

*Primary Examiner* — Mark Rinehart
*Assistant Examiner* — Kenneth P Hunt
(74) *Attorney, Agent, or Firm* — Shumaker & Sieffert, P.A.

(57) ABSTRACT

Layer two (L2) forwarding of multicast traffic between routers of a Virtual Private local area network (LAN) Service (VPLS) domain is described. For example, the techniques allow multicast traffic to generally be forwarded between VPLS routers based on L2 information only, without requiring the routers to examine any layer three (L3) information carried by the multicast traffic for forwarding the multicast traffic. A router dynamically learns a mapping between a multicast source device and an L2 address of a router that introduces multicast traffic into the VPLS domain from the multicast source device. The router installs forwarding information based on the mapping that specifies the L2 address of the router that introduces the multicast traffic, and an L2 multicast group address of the multicast group, and forwards multicast traffic for the multicast group based on the forwarding information without reference to any L3 information of the multicast traffic.

25 Claims, 5 Drawing Sheets

FORWARDING MULTICAST PACKETS IN A VPLS ROUTER ON THE BASIS OF MAC ADDRESSES

This application claims the benefit of U.S. Provisional Application No. 61/325,104, filed Apr. 16, 2010, which is hereby incorporated by reference in its entirety.

TECHNICAL FIELD

The disclosure relates to computer networks and, more particularly, to virtual private local area network service (VPLS) domains established over computer networks.

BACKGROUND

Networks that primarily utilize data link layer devices are often referred to as layer two (L2) networks. A data link layer device is a device that operates within the second layer of the Open Systems Interconnection (OSI) reference model, i.e., the data link layer. One example of a common L2 networks is an Ethernet network in which end point devices (e.g., servers, printers, computers) are connected by one or more Ethernet switches. The Ethernet switches forward Ethernet frames, also referred to as L2 communications or L2 packets to devices within the network. As the Ethernet switches forward the Ethernet frames the Ethernet switches learn L2 state information for the L2 network, including media access control (MAC) addressing information for the devices within the network and the physical ports through which the devices are reachable. The Ethernet switches typically store the MAC addressing information in MAC tables associated with each of their physical interfaces. When forwarding an individual Ethernet frame, an ingress port of an Ethernet switch typically broadcasts the Ethernet frame to all of the other physical ports of the switch unless the Ethernet switch has learned the specific physical port through which to the destination MAC address devices is reachable. In this case, the Ethernet switch forwards a single copy of the Ethernet frame out the associated physical port.

Virtual private local area network service (VPLS) may be used to extend two or more remote L2 networks, i.e., VPLS sites, through a network (usually referred to as a provider network), such as the Internet, in a transparent manner, i.e., as if the network does not exist. In particular, routers running VPLS instances transport layer two (L2) communications, such as Ethernet packets, between customer networks via the network. In a typical configuration, provider edge (PE) routers coupled to the customer networks (such routers will be referred to as "members of a VPLS domain") define label switched paths (LSPs) that may be used as pseudowires within the provider network to carry encapsulated L2 communications as if these customer networks were directly attached to the same local area network (LAN).

PE routers that are members of the VPLS domain each run a VPLS instance that participates in the VPLS domain, and maintain state data for the VPLS instance including Media Access Control (MAC) addresses learned from locally attached customer sites. In addition, each PE router also maintains state data specifying MAC addresses that belong to remote customer sites that are attached to remote PE routers. The VPLS PE routers dynamically learn MAC addresses of remote customer sites over the pseudowires that are established among all the VPLS PE routers.

There is a growing need for support of multicast-based services such as Internet Protocol (IP) television (TV). Customer routers are now likely running IP multicast protocols, and routers and connected switches associated with the VPLS will be handling a large amount of multicast traffic. Many current VPLS solutions perform replication for multicast traffic at the ingress PE routers. In many current VPLS solutions, L2 multicast traffic is treated as broadcast traffic and is flooded to every site in the VPLS domain. That is, a PE router may simply broadcast all multicast Ethernet frames over all corresponding attachment circuits (ACs) and pseudowires (PWs) originating from the PE router for the VPLS domain. Such a technique has the advantage of keeping P and PE routers completely unaware of IP multicast-specific issues.

However, flooding L2 multicast traffic to every site in a VPLS domain has scalability drawbacks in terms of bandwidth waste, which can lead to increased cost in large-scale deployment. For example, when L2 multicast traffic is broadcast to all PE routers in a VPLS domain, multicast traffic may be sent to sites with no members in the multicast group, i.e., subscribers that desire the multicast traffic. This may happen, for example, when an upstream PE does not maintain downstream membership information. In this case, the upstream PE simply floods L2 multicast frames to all downstream PE routers, and downstream PE routers forward them to directly connected CE routers; however, those CE routers might not service subscriber devices that are members of the specific multicast group associated with the multicast traffic. This unnecessary traffic may result in adverse pressure on customer resources, and can also require wasteful over-provisioning by Service Providers to cover such traffic. As another example, when multicast is broadcast to all PE routers in a VPLS domain, this can result in replication of traffic on PWs that share a physical path. This replication is often inefficient in terms of bandwidth usage if those PWs traverse shared physical links in a backbone network of the service provider.

One way in which certain VPLS deployments seek to reduce broadcast multicast traffic is to configure the routers to snoop on L3 signaling message to determine L3 information for which VPLS sites are interested in which particular multicast groups. When forwarding the L2 multicast frames, the routers examine the L3 information within the encapsulated L3 multicast control packets to influence the forwarding decisions. This examination is called "snooping" (e.g., Protocol Independent Multicast (PIM) or Internet Group Management Protocol (IGMP) snooping, for instance). The multicast data packets are then forwarded on the basis of their L3 addresses. However, such an approach can be viewed as a violation of L2 forwarding principles and may lead to inefficiencies in state information maintained by the routers.

SUMMARY

In general, this disclosure is directed to techniques for performing layer two (L2) forwarding of multicast traffic between routers of a Virtual Private local area network (LAN) Service (VPLS) domain. For example, the techniques allow multicast traffic to generally be forwarded between VPLS routers based on L2 information without requiring the routers to examine any layer three (L3) information carried by the multicast traffic for forwarding the multicast traffic.

To facilitate forwarding L2 multicast frames within a VPLS domain based on L2 information, as described herein, a router may apply various techniques to learn and create a mapping between an L3 address of a multicast source and an L2 address of a first-hop router for multicast traffic from the source into the VPLS domain. The router, such as a provider edge (PE) router, can learn this mapping through a variety of mechanisms, examples of which are described in further detail below. For example, the PE router may receive extended Protocol Independent Multicast (PIM) or Internet Group Management Protocol (IGMP) packets that include additional information that allows the PE router to determine this mapping. In some cases, this additional information provides the PE router with the mapping. In other cases, the PE router may determine the mapping based on the additional information in combination with other information previously obtained by the PE router by snooping other packets, such as PIM-hello messages. The PE router is configured to determine L2-based routes to store in forwarding information based on the additional information obtained by the snooping. In this manner, the PE router can learn the information necessary to subsequently forward L2 multicast frames within the VPLS domain based only on the L2 headers of the L2 multicast frames without requiring the PE router to broadcast the L2 multicast frames to all other PE routers in the VPLS domain. In addition, with the ability to forward L2 multicast frames based only on their L2 headers, the PE router no longer needs to snoop into L3 information within the L2 multicast frames being forwarded or maintain extensive L3 forwarding state to forward L2 multicast traffic in the VPLS domain.

The techniques may provide one or more advantages. For example, by avoiding broadcasting of the L2 multicast traffic within a VPLS domain, the techniques may allow PE routers that are members of a VPLS domain to minimize the sending of multicast traffic to downstream PE routers that are not connected to any CE routers that are members of the multicast groups associated with the multicast traffic. As another example, the techniques may reduce unnecessary replication of traffic on PWs that share a physical path, which may potentially lead to a more efficient use of bandwidth.

As another example, by removing a need for the PE router to snoop into L3 information within the L2 multicast frames being forwarded, this may improve the security mechanisms in the protocol that would otherwise have been snooped (e.g., PIM or IGMP). This improvement may occur because the snooping equipment (PE routers) may be managed by a different administrative group than the origin of the protocol packets (CE routers), and so configuration of encryption/authentication of the protocol packets may be omitted when snooping is expected to occur. Avoiding the need to snoop into L3 information within these L2 multicast frames may allow configuration of encryption/authentication of the protocol packets to be performed, improving security. In addition, when a source MAC address (SMAC) is available at the PE routers, this may afford some additional security, as the PE router is aware of exactly which router the packet will be sourced at, and it may be more difficult to spoof router MAC addresses (since the set of valid router MAC addresses is smaller than the set of 'valid IP source addresses possible' at the service provider).

As another example, the techniques may avoid reliance on the assumption that L3 information (e.g., IP routing information) is maintained and used in the data plane for forwarding transient VPLS multicast traffic. Thus, additional IP routing tables on a per-VPLS instance basis need not be installed and populated when multicast snooping is configured in a VPLS PE router. This removes the need for special-case prefixes, unrelated to the expected multicast data traffic, to be installed in an additional IP routing table. This avoids the need for special-case route prefixes, unrelated to the expected multicast data traffic, to be installed in an additional IP routing table. For example, special routes need not be created to handle unicast-protocol control traffic. This is in contrast to a situation in which all packet with a multicast destination MAC address must be forwarded using a special VPLS-inet/inet6 routing table that contains layer three routes, which results in unicast protocol control traffic that is sent to a multicast address being handled through this special routing instance, requiring the routing daemon to set up special routes that handle the 224.0.0.0 through 224.0.0.255, with the inet6 table getting more complicated. Rather than this arrangement, the techniques described herein allow unicast-protocol control traffic that is sent to a multicast address to be transparently flooded, such as by including (SMAC, GMAC) routes in a VPLS forwarding table. The techniques may provide a more elegant VPLS multicast solution in that the VPLS multicast mechanisms may now conform to the rest of VPLS forwarding, which uses L2 addresses (e.g., MAC addresses) to determine outgoing ports. In some embodiments, the techniques may avoid the need to extract L3 information of the multicast traffic being forwarded into a key buffer for multicast lookup in the VPLS-enabled PE router.

The techniques described herein may also provide a reduction in memory requirements and utilization when forwarding IP version six (IPv6) multicast, as compared to using L3 forwarding information in the data plane for forwarding L2 multicast traffic. For example, ninety-six bits of IPv6 MAC address (for L2 forwarding) requires less memory space than are required by, for example, 256 bits of (*,G) or (S,G) that would otherwise be required to identify a particular source and group associated with the multicast traffic for L3 forwarding.

As another example, the techniques described herein may allow simplification of hardware requirements to match routes, in that the techniques allow an exact match determination in hardware to be made based on a fixed-width L2 address (e.g., a forty-eight or ninety-six bit MAC address), rather than a best match based on an arbitrary-prefix-length of L3 address (e.g., an IP address). As a further example, the techniques described herein may allow for forwarding of IPv6 multicast packets on a VPLS PE router that may have limited key-space in a key buffer for forwarding packets, where the limited key-space would otherwise preclude forwarding of IPv6 multicast packets if it was required to look up VPLS and IP material in the key buffer. As another example, the techniques described herein may allow for transparent flooding of unicast protocol control traffic that is not related to multicast data but is sent to a multicast address (e.g., an all-OSPF-routers address), without requiring this traffic to be handled through setup of special routes.

As a further example, the techniques described herein may allow for setting up a forwarding information base (FIB) at the time of first-data-traffic transiting with source MAC/group MAC multicast address (SMAC, GMAC) routes. For resolution when a multicast routing information base (RIB) of a router is synchronized to the multicast FIB, the router needs resolve routes that match the MAC addresses corresponding to the "224/4" or "ff00/8" prefixes (i.e., 01:00:5 E:00/25 for 224/4 and 33:33/16 for ff00/8), and point them to resolve next hops. The matches for these prefixes are 25 and 16 bits long, respectively. The kernel/PFE will send packets to the protocols following regular resolution steps. The multicast-RIB and multicast-FIB can be synchronized for the particular SMAC/GMAC at this time.

In one embodiment, a method includes with a router of a VPLS domain, dynamically learning a mapping between a multicast source device and an L2 address of a router that introduces multicast traffic into the VPLS domain from the multicast source device for a multicast group. The method also includes, based on the learned mapping, installing forwarding information within the router that specifies the L2 address of a router that introduces the multicast traffic into the VPLS domain from the multicast source device and an L2 multicast group address associated with the multicast group, and forwarding received multicast traffic to receivers of the multicast traffic for the multicast group from the router based on the forwarding information without reference to any L3 information of the multicast traffic, wherein the received multicast traffic is received as L2 multicast frames having L2 headers.

In another embodiment, a router includes a VPLS module that dynamically learns a mapping between a multicast source device and an L2 address of a router that introduces multicast traffic into the VPLS domain from the multicast source device. The router also includes a forwarding engine that, based on the learned mapping, installs forwarding information that specifies the L2 address of the router that introduces the multicast traffic into the VPLS domain from the multicast source device, and an L2 multicast group address associated with the multicast group, and forwards received multicast traffic to receivers of the multicast traffic for the multicast group based on the forwarding information without reference to any L3 information of the multicast traffic, wherein the received multicast traffic is received as L2 multicast frames having L2 headers.

In another embodiment, a computer-readable storage medium comprises instructions. The instructions cause a programmable processor to dynamically learn a mapping between a multicast source device and an L2 address of a router that introduces into the VPLS domain multicast traffic from the multicast source device, and install forwarding information based on the learned mapping that specifies the L2 address of the router that introduces multicast traffic into the VPLS domain from the multicast source device and an L2 multicast group address associated with the multicast traffic. The instructions also cause the programmable processor to forward received multicast traffic destined for the L2 multicast group address based on the forwarding information without reference to any L3 information of the multicast traffic, wherein the received multicast traffic is received as L2 multicast frames having L2 headers.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
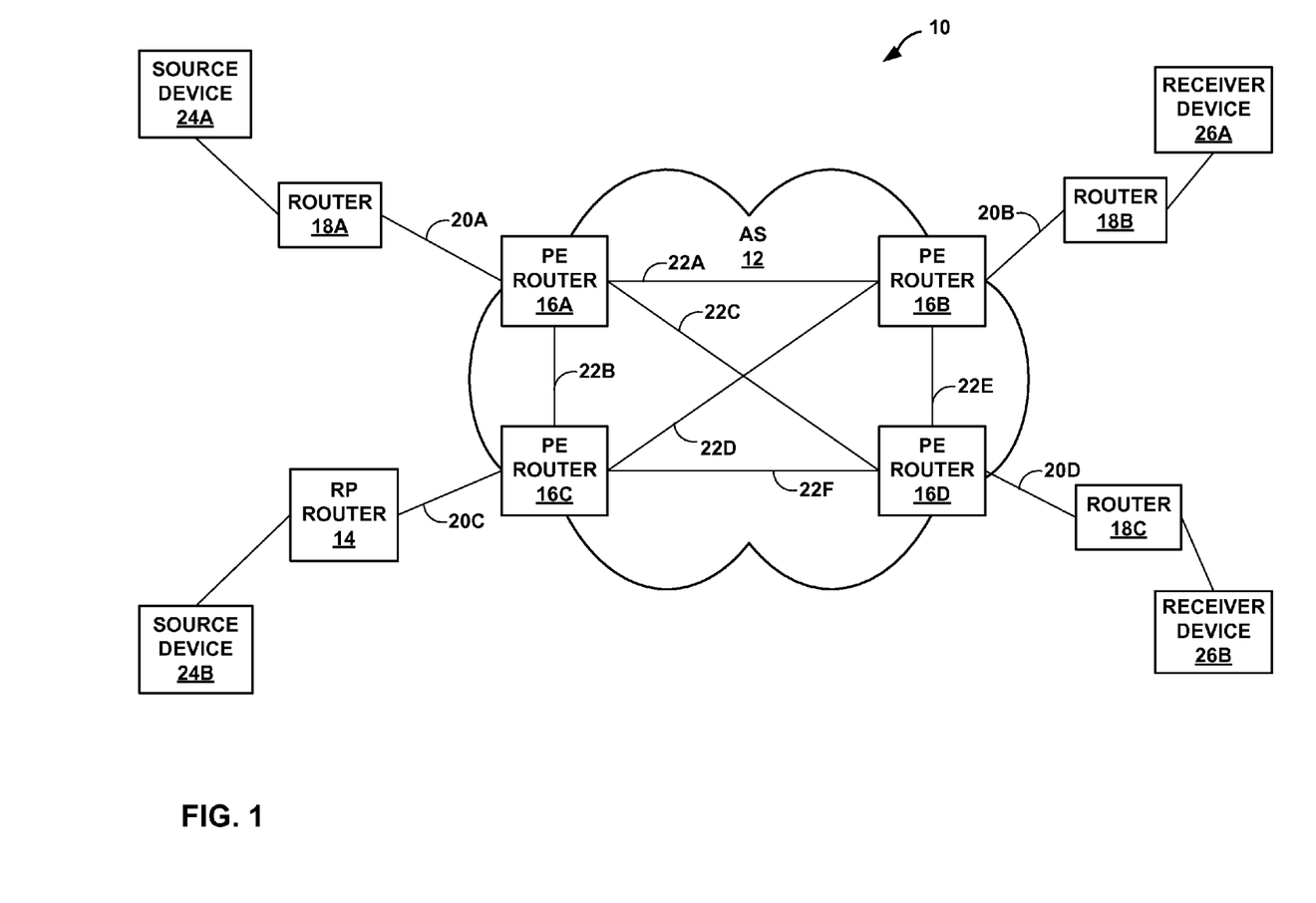
FIG. 1 is a block diagram illustrating an example system that includes an example autonomous system (AS) network that includes VPLS devices configured to forward multicast packets within the VPLS on the basis of MAC addresses.

FIG. 1 is a block diagram illustrating a system 10 in which an example autonomous system (AS) network 12 includes provider edge (PE) routers 16A-16D ("PE routers 16") configured to forward multicast packets on the basis of Media Access Control (MAC) addresses to other member devices of virtual private local area network service (VPLS) domains. In this example, PE router 16A is coupled to source device 24A via router 18A, and PE router 16C is coupled to source device 24B via rendezvous point (RP) router 14. Source devices 24A-24B ("source devices 24") are sources of multicast traffic, such as servers. PE router 16B is coupled to receiver device 26A via router 18B, and PE router 16C is coupled to receiver device 26B via router 18C. Receiver devices 26A-26B ("receiver devices 26") are receivers of the multicast traffic from source devices 24. Routers 18A-18C may be, for example, edge routers associated with respective VPLS sites.

PE routers 16 are members of one or more VPLS domains, and may transmit multicast content, such as Internet Protocol (IP) video services, IP television (IPTV), desktop conferences, corporate broadcasts, or other content, from source devices 24 to one or more of the receiver devices 26. In this example, routers 14, 18 and devices 24, 26 connected thereto are configured as members of the same VPLS domain. RP router 14 may be a Protocol-Independent Multicast (PIM) rendezvous point for one or more multicast groups. Pseudowires (PWs) 22A-22F ("PWs 22") couple respective PE routers 16, and attachment circuits 20A-20D couple PE routers 16 to respective ones of routers 18 or RP router 14.

Source devices 24 and receiver devices 26 may be part of geographically separate VPLS sites (not shown) that may, for example, comprise private networks for different offices of a single enterprise, and may include a local area network (LAN) or a wide area network (WAN). Similarly, receiver devices 26 may be located in VPLS sites and represent subscriber devices, such as desktop computers, laptops, workstations, PDAs, wireless devices, network-ready appliances, file servers, print servers or other devices. System 10 may include a portion of the Internet or other intermediate public or private network that couples the remote sites. In some cases, AS 12 may be a service provider network, and/or may be a multiprotocol label switching (MPLS) network.

A VPLS domain established across AS 12 may transport layer two (L2) communications, such as Ethernet packets, between one of source devices 24 and one or more of receiver devices 26. That is, a VPLS domain may be used to extend the VPLS sites through AS 12 in a transparent manner, i.e., as if AS 12 does not exist. That is, from an L2 perspective, local networks associated with routers 14, 18 may operate as if directly connected. PE routers 16 may define label switched paths (LSPs) within AS 12 to carry encapsulated L2 communications across AS 12. The LSPs may be used as PWs to emulate an L2 communication service, such as Ethernet, over AS 12 in order to exchange encapsulated L2 communications, such as Ethernet packets, across AS 12 as though devices of the VPLS sites were directly attached to the same local area network (LAN). In the example of FIG. 1, PWs 22 are established in AS 12.

PE routers 16 that are members of a VPLS domain (also sometimes referred to herein as "VPLS PE routers") typically each maintain state information for the domain, including Media Access Control (MAC) addresses for the local network VPLS site as well the remote VPLS sites. PE routers 16 learn MAC addresses of remote VPLS sites while forwarding L2 traffic over pseudowires that are established among PE routers 16.

In the context of multicasting, routers 14, 18 may use Protocol Independent Multicast (PIM) to create multicast layer three (L3) routing information for establishing distribution trees for delivering multicast packets. The routers typically use PIM hello messages to learn about neighboring PIM-enabled routers on each network interface. In general, the PIM-enabled routers flood PIM-hello messages to one another via PE routers 16. Further details regarding PIM can be found in W. Fenner, et al., "Protocol Independent Multicast—Sparse Mode (PIM-SM)," RFC 4601, August 2006, the entire content of which is incorporated by reference herein.

Each of PE routers 16 snoops on the PIM-hello messages exchanged by routers 14, 18, and thus is aware of all of PIM-enabled routers 18A reachable by its interfaces. Further information on VPLS routers performing PIM snooping can be found in Hemige, et al., "PIM Snooping over VPLS," an Internet Draft by the Internet Engineering Task Force, draft-ietf-12vpn-vpls-pim-snooping-01.txt, March 2007, the entire content of which is incorporated by reference herein.

Edge routers 14, 18 servicing devices 24 and receiver devices 26 may use Internet Group Management Protocol (IGMP) messages to control membership of the receiver devices within different multicast groups. For example, routers 14, 18 may exchange IGMP join/leave messages in response to requests from receiver devices 26 requesting to receive or terminate reception of multicast information from source devices 24. Intermediate PE routers 16 may snoop on these messages so as to learn which of receiver devices 26 are members of a given multicast group. Techniques for IGMP snooping are discussed in M. Christensen, et al., "Considerations for Internet Group Management Protocol (IGMP) and Multicast Listener Discovery (MLD) Snooping Switches," RFC 4541, May 2006, the entire content of which is incorporated by reference herein. For example, router 18B may send a PIM join message for a multicast group G1 toward RP router 14 on behalf of receiver device 26A. PE router 16C receives the join message from PE router 16B on PW 22D, for example, and snoops the join message to learn the group G1 and source address associated with the join message before forwarding the join message to RP router 14. PE router 16C maintains state indicating that upon receiving multicast traffic for group G1, PE router 16C should forward the multicast traffic on PW 22D, as a device behind PE router 16B has requested to receive that multicast traffic. In the example of FIG. 1, there may be two sources sending multicast traffic for group G1, i.e., source device 24A and source device 24B.

As one example, when L3 multicast traffic initially is output on an interface of source device 24A is received by router 18A, the router may operate to form L2 multicast frames by affixing an L2 multicast header to each L3 multicast packet received from source device 24A and forward the L2 multicast frame to PE router 16A for injecting into the VPLS domain. In this case, router 18A operates as a root of a multicast distribution tree for the distribution of the multicast traffic for the group. Alternatively, router 18A may in turn encapsulate the L3 multicast packets as unicast PIM-register packets and tunnel the packets to RP router 14 via PE router 16A. Upon receiving the tunneled packets, RP router 14 removes the PIM register header and forms L2 multicast frames from the encapsulated L3 multicast packets, which the RP router then send into the VPLS domain as the root of the multicast distribution tree.

Figure 2A:
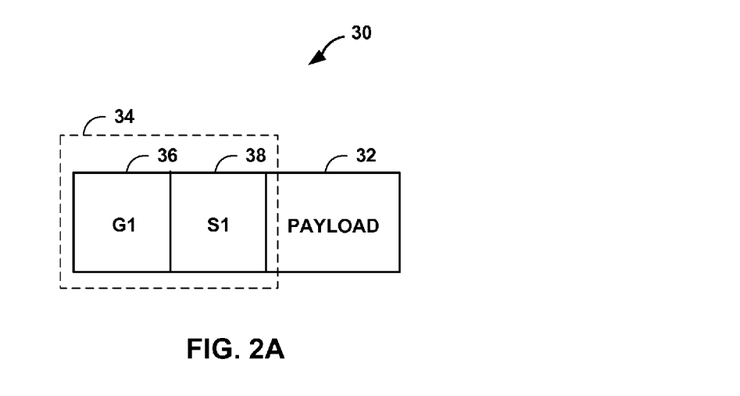
FIG. 2A is a block diagram illustrating an example message format for an L3 multicast packet.

FIG. 2A is a block diagram illustrating an example message format for an L3 multicast packet 30 to be introduced into the VPLS domain. L3 multicast packet 30 includes payload 32, and an L3 multicast header 34 that includes an L3 multicast group address 36 for the multicast group to which the multicast packet is being sent (e.g., an IPv4 multicast group address) and an L3 multicast source address 38 of source device 24B (e.g., an IPv4 address or an IPv6 address). L3 multicast source address 38 is an L3 address for the unicast interface for the source device that originated the multicast traffic. In FIG. 2A, L3 multicast group address 36 is denoted as "G1" and L3 multicast source address 38 is denoted as "S1."

Figure 2B:
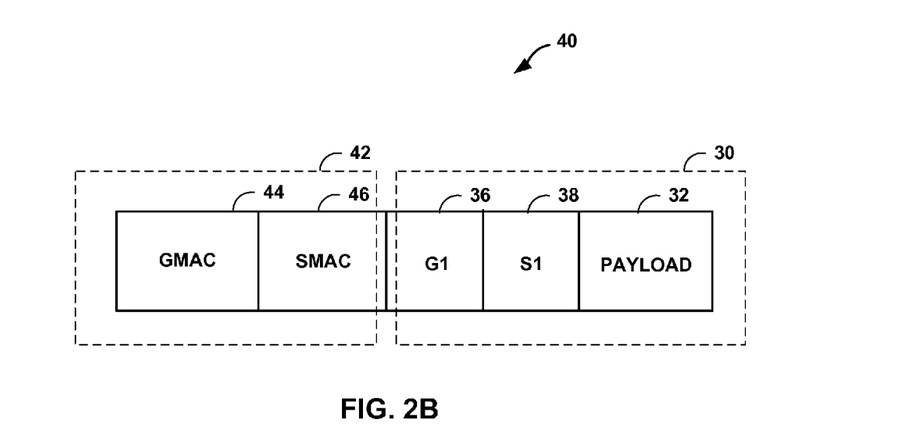
FIG. 2B is a block diagram illustrating an example frame format for an L2 multicast frame.

FIG. 2B is a block diagram illustrating an example frame format for L2 multicast frame 40. RP router 14 forms L2 multicast frame, for example, by encapsulating L3 multicast packet 30 in an L2 header 42 that includes an L2 multicast group address 44 (e.g., a multicast MAC derived from the L3 multicast group address 36). In FIG. 2B, L2 multicast group address 44 is denoted as "GMAC," which refers to a group MAC multicast address. RP router 14 derives the GMAC multicast address based on G1, the L3 multicast group address 36, using an algorithm that maps the L3 multicast group address 36 to the L2 multicast group address 44, which is an Ethernet destination address beginning with 01-00-5E in hex. L2 header 42 also includes a source MAC address (SMAC) 46, which is typically the source MAC address of the router that operates as the root of the multicast distribution tree. For example, for PIM-tunneled multicast traffic, RP router 14 applies as its own MAC address, as the RP router is the first-hop router for the multicast traffic flowing into the VPLS domain. When forwarding transient L2 multicast traffic within the VPLS domain, VPLS-enable routers utilize L2 header 42 formed from GMAC 42 and SMAC 46. For example, when making L2 forwarding decisions for L2 multicast frame 40, a VPLS-enabled router selects the pseudowires and output interfaces into which to inject copies of the L2 multicast frame based on which VPLS sites have receiver devices that have requested the multicast traffic. Moreover, even though such requests may be identified from previously snooped L3 join messages that do not convey L2 information (i.e., SMAC 46), the VPLS-enabled routers apply the techniques described herein to forward the L2 multicast frame 40 using only L2 header 42 without having to examine portions of L3 header 30.

For example, referring again to FIG. 1, upon receiving the transient L2 multicast frame 40 to be forwarded, PE router 16C does a lookup in a MAC table associated with the VPLS domain, using information in L2 header 42 as a key, to determine which other PE routers 16 to which to forward L2 multicast frame 40. The MAC table includes a multicast entry that indicates which of PE routers 16 have indicated they service VPLS sites that wish to receive the multicast traffic associated with the (SMAC, GMAC), corresponding to (L2 multicast source address 46, L2 multicast group address 44). PE router 16C may have populated the multicast entry based on prior snooping of multicast join requests, which are L3 control packets previously exchanged by routers 18 that indicate multicast group membership based on an indication of an (S, G) corresponding to the (L3 multicast source address 38, L3 multicast group address 36). For example, PE router 16C may build a MAC table based on snooping of IGMP join requests.

Moreover, even though the SMAC information is not available in the original join request, PE router 16C applies the techniques described herein to map the L3 multicast source address 38 (S1) in the join request to a specific L2 multicast source address 46 (SMAC) that is necessary to subsequently forward L2 multicast traffic from a particular source device that is selected to provide the multicast traffic for the group. Moreover, PE router 16C may create and install the L2 information for the specific source device prior to receiving the L2 multicast frames to be forwarded. This allows PE router 16C to create L2 forwarding state in the MAC table rather than require installation of L3 forwarding state typically learned by snooped IGMP message, which in turn allows PE router 16C to forward the transient L2 multicast frame 40 based only on the L2 header 42 of the packet without having to also examine the contents of the encapsulated L3 multicast packet 30. Various mechanisms by which PE router 16C can automatically create a mapping between the S1 for a multicast group and the SMAC for a particular source device servicing that group are proposed herein. In contrast, certain multicast protocols, such as PIM and IGMP, work entirely at the L3 layer and do not provide such mapping. PE router 16C may utilize this learned SMAC to generate forwarding state for a complete L2 header 42, as the L2 multicast group address 44 (GMAC) portion can be derived from the L3 multicast group address 36 (G1).

In accordance of the techniques described herein, PE router 16C applies the techniques described herein to forward L2 multicast frames in a manner that avoids flooding the L2 multicast frames to each of PE routers 16A, 16B, and 16D. Instead PE router 16C is able to send the L2 multicast frame 40 to only those PE routers 16 servicing VPLS sites having receiver devices 26A that wish to receive the particular multicast traffic. Moreover, PE router 16C achieves this targeted forwarding while avoiding having to examine the L3 header portions of the transient L3 multicast packets being forwarded.

By providing PE router 16C with the mapping of the L3 multicast source address 38 (S1) to the L2 multicast source address 46 (SMAC), the techniques described herein may avoid the need to maintain L3 information (e.g., IP routing information) in the data plane of PE router 16C for forwarding transient L2 VPLS multicast traffic. Thus, additional IP routing tables on a per-VPLS instance basis need not be installed and populated in PE routers 16 as is typical when multicast snooping is configured in a VPLS PE router. The techniques described herein may provide a more elegant VPLS multicast solution in that the VPLS multicast mechanisms may now conform to the rest of VPLS forwarding, which emulates L2 switching to provide VPLS service without relying on L3 forwarding information. The techniques described herein provide mechanisms for VPLS multicast forwarding based on L2 addresses, and avoid the scenario in which PE router 16C must simply flood the multicast traffic to all the other PE routers 16 in all cases.

In cases where all receiver devices are configured to receive multicast traffic from a rendezvous point (RP)-rooted shared tree (RPT) sourced by RP router 14 (and not subsequently switch to receiving the multicast traffic from a distribution tree rooted by router 18A), it may be possible to perform best-case L2 forwarding within network 10 without regard to SMAC in the L2 multicast data traffic. For example, in some cases L3 multicast traffic from source device 24 B may be conveyed directly to RP router 14 while L3 multicast packets from source device 24A may be tunneled to RP router 14 through unicast PIM-register packets from router 18A. In either case, RP router 14 injects L2 multicast frames into the VPLS domain to communicate the multicast packets to receiver devices 26. With RPT-only distribution, i.e., cases where receivers 26 are configured to not switch to trees rooted by router 18A for the same multicast group even though the tree may be shorter, it may be possible for PE router 16C to install forwarding information in routers 16 (e.g., in the form of a special route) that directs the forwarding components of the PE router to perform L2 multicast frame replication to a specific list of output ports upon matching only on the GMAC, without requiring use of the SMAC, as shown in Table 1 as a replication list of ports:

TABLE 1

| VPLS PE | L2 Prefix to match | Ports to which to replicate |
| --- | --- | --- |
| PE router 16A | — | — |
| PE router 16B | GMAC | AC 20B |
| PE router 16C | GMAC | PW 22D, PW 22F |
| PE router 16D | GMAC | AC 20D |

Table 1 is shown for purposes of example, and omits certain details such as ports required for PIM-assert-generation.

However, such configuration may not be a viable option for all cases. For example, in some situations protocols, such as Protocol Independent Multicast—Sparse Mode (PIM-SM), provide PE routers 16 with the option to use the shortest-path tree (SPT) for distribution of multicast traffic from the source for some or all of the receivers. If PE router 16B should opt to switch to the SPT from router 18A for distribution of multicast traffic from the source (e.g., source device 24A) to receiver device 26A, then data-plane replication of L2 multicast traffic based on GMAC addresses only at PE router 16C will not be sufficient. For example, multicast traffic from source device 24A to receiver device 26A will take the SPT path of: router 18A→PE router 16A→PE router 16B→router 18B, and the RPT path for receiver device 26A will be pruned. However, it is possible that receiver device 26A will choose not to switch to the SPT for source device 24B, e.g., because the number of hops for the RPT vs. the SPT is the same for source device 24B to receiver device 26A. Thus, to distribute traffic for multicast group G1 from source device 24B to receiver device 26A, the forwarding information that provides traffic distribution for group G1 along PW 22D must remain installed in PE router 16C. Yet traffic from source device 24A will continue to arrive at RP router 14, as receiver device 26B has not switched over to using the SPT. If only the GMAC-based route remains, a copy of the source device 24A traffic will also go to receiver device 26A through the PW, resulting in duplication. To avoid this duplication, PE router 16C may install L2 multicast forwarding information that matches on the SMAC as well as the GMAC, as shown in Table 2 as a replication list of ports:

TABLE 2

| VPLS PE | L2 Prefix to match | Ports to which to replicate |
| --- | --- | --- |
| PE router 16A | GMAC | PW 22A |
| PE router 16B | GMAC | AC 20B |
| PE router 16C | SMAC of RP router 14, GMAC | PW 22D |
| PE router 16C | GMAC | PW 22F |
| PE router 16D | GMAC | AC 20D |

Multicast packets from source device 24B, which have the MAC address of RP router 14 as the SMAC, will match the longer route at PE router 16C (with the matching prefix of SMAC of RP router 14, GMAC), and will be forwarded by PE router 16C to PE router 16B through PW 22D; multicast packets from source device 24A, which have the MAC address of router 18A as the SMAC, will not match the above route and therefore will take the GMAC route for PE router 16C, and will be forwarded by PE router 16C to PE router 16D through PW 22F.

As discussed above, a VPLS PE router snooping on PIM, being an L3 protocol, does not learn the MAC for a specific source router that will subsequently operate as a root of a distribution tree, or as a first hop router (FHR), to distribute the multicast traffic for the particular multicast group from that source. Thus, a VPLS PE router may not necessarily have adequate L3 unicast routing information to be aware of an IP address of the source device's first hop router, and then get the router MAC using the router's IP address. If PE routers 16 had information about the SMAC of a source device's first hop router, the PE routers 16 could forward L2 multicast frames 40 in the VPLS based solely on L2 headers 42, which could provide advantages in routing efficiency, bandwidth use, and state reduction.

Current implementations of PIM do not provide a mechanism for informing a VPLS PE router 16 about the first-hop router SMAC associated with a particular multicast source so that the SMAC can be subsequently used for forwarding L2 multicast frames without requiring peeking into any L3 information encapsulated within the multicast frames. This disclosure proposes several mechanisms for a VPLS PE router 16 to learn this mapping, as described in further detail below, thereby allowing the VPLS PE router to forward VPLS multicast traffic based on the L2 header only.

Figure 3:
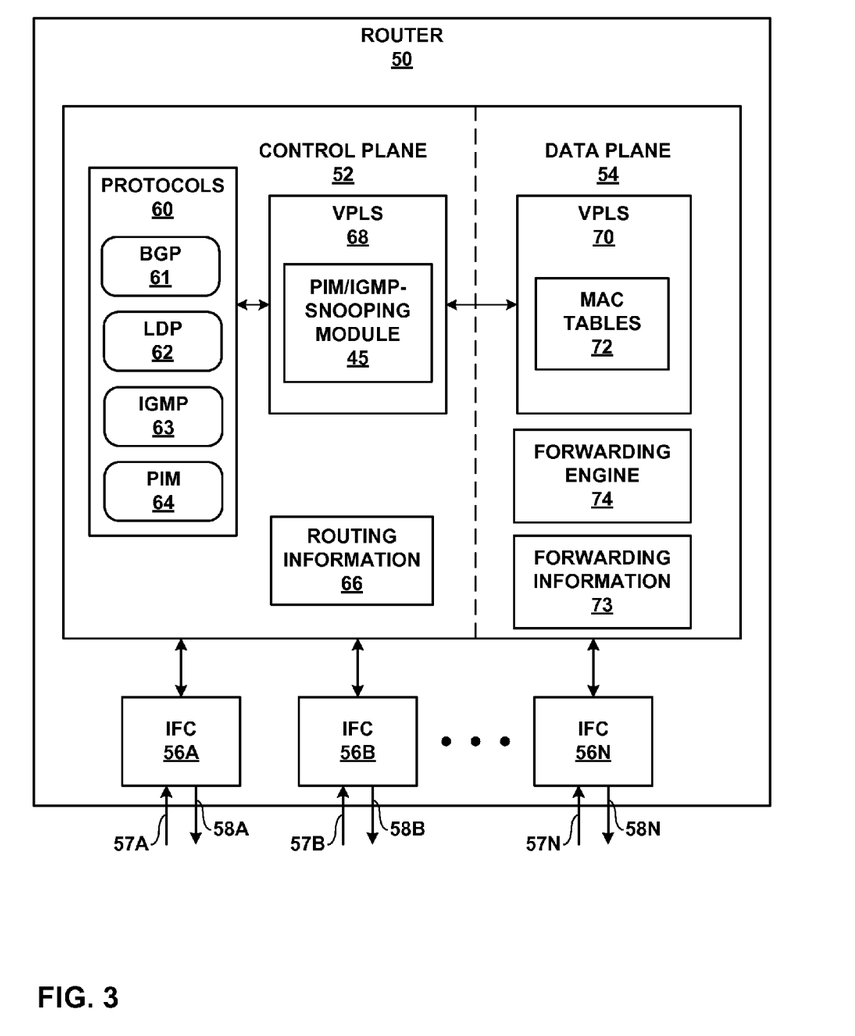
FIG. 3 is a block diagram illustrating an example PE router configured to forward multicast packets within a VPLS domain based on L2 headers only.

FIG. 3 is a block diagram illustrating an exemplary router 50 capable of forwarding VPLS multicast traffic based on L2 headers only, as described herein. Router 50 may comprise a PE router that employs the VPLS multicasting techniques described herein, substantially similar to any of PE routers 16 of FIG. 1. Router 50 includes interface cards 56A-36N ("IFCs 56") that receive control packets and data packets via inbound links 57A-37N ("inbound links 57") and send control packets and data packets via outbound links 58A-38N ("outbound links 58"). IFCs 56 are typically coupled to links 37, 38 via a number of interface ports (not shown). Router 50 also includes a control plane 52 that determines routes of received packets and a data plane 54 that forwards the packets accordingly via IFCs 56.

Control plane 52 represents high-level control functions for router 50 and typically provides routing protocols, device management and configuration functions and other administrative functions. For example, control plane 52 provides an operating environment for protocols 60 to execute, which may be software processes executing on one or more processors. In the illustrated embodiment, protocols 60 include the border gateway protocol (BGP) module 61 as an exemplary routing protocol and a label distribution protocol (LDP) module 62. Protocols 60 also include IGMP 63 as a multicast management protocol and PIM 64 as a multicast routing protocol.

Control plane 52 maintains routing information 66. Routing information 66 describes the topology of a network and, in particular, routes through the network. Routing information 66 may include, for example, route data that describes various routes within the AS 12 of FIG. 1, and corresponding next hop data indicating appropriate neighboring devices within AS 12 for each of the routes. Protocols 60 (e.g., BGP module 61 and LDP 4 module 2) executing within control plane 52 of router 50 update routing information 66 to accurately reflect the topology of the autonomous system in which router 50 resides as well as label distributions utilized by router 50. Control plane 52 generates and maintains forwarding information 73 within data plane 54 based on routing information 66. Typically, control plane 52 generates forwarding information 73 in the form of a radix tree to map packet information (e.g., header information having destination information and/or a label stack) to next hops and ultimately to interface ports of IFCs 56.

Data plane 54 represents hardware and logic functions that provide high-speed forwarding of network traffic. Data plane 54 maintains forwarding information 73 for each VPLS instance established by router 50 to associate network destinations with specific next hops and the corresponding interface ports. Forwarding information 73 includes multicast routes that indicate interface ports to which to replicate received multicast packets. In general, when router 50 receives a data packet on an attachment circuit or a pseudowire of a given VPLS instance one of inbound links 57, forwarding engine 74 of data plane 54 identifies associated next hop(s) for the data packet by traversing forwarding information 73 based on information (e.g., header information) within the packet. Forwarding engine 74 replicates the data packet if necessary (e.g., in the case of multicast) and forwards the data packet on one of outbound links 58 to the corresponding next hop in accordance with forwarding information 73 associated with the VPLS instance. At this time, forwarding engine 74 may push and/or pop labels to and from the packet to forward the packet along a correct pseudowire.

Control plane 52 also includes a VPLS module 68 that performs L2 learning, e.g., learning of customer device MAC addresses from inbound PWs and association of those customer MAC addresses with corresponding outbound PWs and output interfaces. Data plane 54 includes a VPLS module 70 capable of communicating with VPLS module 68. VPLS module 68 provides VPLS module 70 with MAC address state for MAC tables 72 maintained by VPLS module 70. VPLS module 70 maintains MAC tables 72 and forwarding information 73 for each VPLS instance established by router 50. For example, VPLS module 70 maintains MAC tables 72 to reflect state information learned via layer 2 communications.

VPLS module 70 included in data plane 54 performs MAC address learning to automatically update portions of forwarding information 73 and MAC tables 72 for each VPLS instance established by router 50. As part of data plane 54, VPLS module 70 is invoked when router 50 receives data packets on the pseudowires (PWs) established by router 50 for any of the PE routers in the AS that are members of the VPLS domain. VPLS module 70 performs MAC address learning and updates the one of MAC tables 72 associated with the VPLS to initially record associations between the PWs connected to router 50 and the source MAC addresses of the VPLS customer devices from which the data packets were received on the PWs. For example, the one of MAC tables 72 records PW numbers that identify the PWs connected to router 50 and records MAC addresses that identify the source customer devices attached to the first AS of the data packets transmitted over the PWs.

In order to update MAC table 72, VPLS module 68 in control plane 52 performs L2 learning and association of L2 customer MAC addresses with specific PWs. VPLS module 68 then communicates information that is associated with the VPLS instance to VPLS module 70 in data plane 54. In this way, VPLS module 70 may be programmed with associations between each PW and output interface and specific source customer MAC addresses reachable via those PWs. VPLS module 70 updates the one of MAC tables 72 associated with the VPLS to associate the customer MAC addresses with the appropriate outbound PW. After the update, the one of MAC tables 72 associated with this particular VPLS instance records associations between the PWs connected to router 50 that are used to transport L2 traffic to the MAC addresses of the customer devices within the VPLS sites of the VPLS domain. In other words, the one of MAC tables 72 for this VPLS instance records associations between the PWs and the network devices to which data packets may be sent on the PWs. For example, the one of MAC tables 72 records PW numbers that identify the PWs sourced by router 50, and for those PW numbers identifies the MAC addresses of the reachable customer devices within the VPLS domain.

In effect, router 50, an L3 device, learns associations between multicast MAC address and pseudowires or attachment circuits (which are mapped to ports), much as an L2 switch learns associations between MAC addresses and ports. Forwarding information 73 may represent a virtual port binding and bridging table. In this sense, the router is acting as a virtual L2 switch to provide VPLS.

To facilitate forwarding Ethernet multicast packets within the VPLS domain based only on L2 headers, router 50 can learn a mapping between an L3 address of a multicast source and a router-MAC address of a first-hop router for multicast traffic from the source into the VPLS domain. Router 50 can learn this mapping through any of a variety of mechanisms, including, for example, the mechanisms described in further detail below. For example, router 50 may receive new or modified PIM or IGMP packets that include additional information that allows router 50 to determine the mapping. In some cases, this additional information provides router 50 with the mapping. In other cases, router 50 may determine the mapping based on the additional information in combination with other information previously obtained from snooping other packets, such as PIM-hello messages. PIM/IGMP-snooping module 65 of VPLS module 68 snoops on L3 portions of PIM messages received by PIM protocol 64 and/or IGMP messages received by IGMP protocol 63, as described above. VPLS module 68 determines MAC-based routes to store in MAC tables 72 and forwarding information 73 based on the additional information obtained by PIM/IGMP snooping module 45. In this manner, router 50 can learn the information necessary to forward Ethernet multicast packets within the VPLS domain based only on the Ethernet headers of the Ethernet multicast packets.

VPLS module 70 receives multicast data packets on inbound links 57. VPLS module 70 determines whether information from the L2 headers of the packets (e.g., the multicast group MAC address and/or the multicast source MAC address) is included in the one of MAC tables 72 associated with the VPLS instance, without requiring VPLS module 70 to look within L3 portions of the encapsulated L3 multicast packet. If the MAC address(es) are included in the one of MAC tables then router 50 forwards the data packets on only the PWs and/or ACs associated with the MAC address based on forwarding information 73 associated with the VPLS instance. If the packet does not match to any entry in the one of MAC tables 72 then VPLS module 70 may flood the multicast data packets to all of the PE routers in the AS via the PWs based on forwarding information 73 associated with the VPLS instance.

In the absence of the techniques described herein for VPLS multicast, PE router 50 may be required to always flood the multicast data packets to all of the PE routers in the AS without regard to whether the PE routers have VPLS sites that are interested in receiving the multicast data packets, or alternatively PE router 50 may be required to look at L3 portions of the encapsulated L3 multicast packet in order to perform targeted forwarding of the L2 multicast frames to interested PE routers, while ensuring that control packets sent to multicast-L3-addresses (e.g., the OSPF-all-routers address) are flooded.

The architecture of router 50 illustrated in FIG. 3 is shown for exemplary purposes only. The disclosure is not limited to this architecture. In other embodiments, router 50 may be configured in a variety of ways. In one embodiment, for example, some of the functionally of control plane 52 and data plane 54 may be distributed within IFCs 56. In another embodiment, control plane 52 may include a routing engine that performs routing functions and maintains routing information base (RIB), e.g., routing information 66, and data plane 54 may include a forwarding engine that performs packet forwarding based on a forwarding information base (FIB), e.g., forwarding information 73, generated in accordance with the RIB and MAC tables 72.

Control plane 32 and data plane 54 may be implemented solely in software, or hardware, or may be implemented as combinations of software, hardware, or firmware. For example, control plane 52 and data plane 54 may include one or more processors which execute software instructions. In that case, the various software modules of control plane 52 and data plane 54 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, magnetic media, optical media, or other computer-readable media. Alternatively, control plane 52 and data plane 54 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), one or more Digital Signal Processors (DSPs) or any combination of the foregoing examples of dedicated hardware, for performing the techniques described herein.

Figure 4:
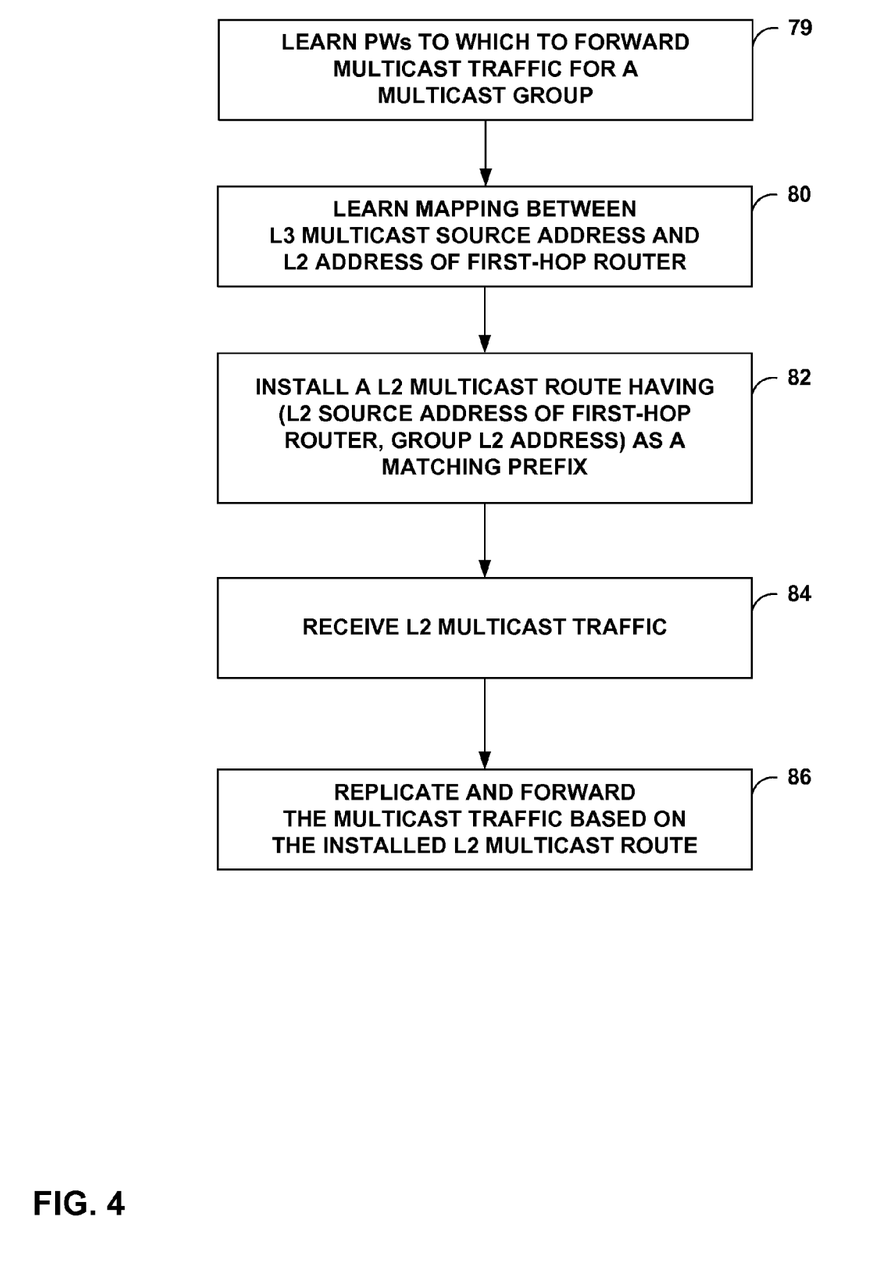
FIG. 4 is a flowchart illustrating example operation of a router in forwarding multicast traffic within a VPLS domain.

FIG. 4 is a flowchart illustrating example operation of a router, such as one of PE routers 16 (FIG. 1) or router 50 (FIG. 3), in forwarding multicast traffic within a VPLS domain. A PE router, such as PE router 16C, builds multicast MAC state by learning which PWs on which to forward multicast traffic for a multicast group, such as by snooping PIM-hello and join/prune messages (79). PE router 16C also learns of the mapping between (S1, SMAC) for the multicast group (80) through one of a variety of mechanisms described below. PE router 16C installs a forwarding information entry (e.g., in MAC tables 72) having (L2 source address of a first-hop router, L2 multicast group address) (SMAC, GMAC) as a matching prefix, and which indicates a list of ports to which to replicate L2 multicast traffic that matches the matching prefix (82), as discovered by the snooping of hello/join/prune messages. When PE router 16C subsequently receives an L2 multicast frame having an L2 header, e.g., an Ethernet multicast packet having a header that specifies an (SMAC, GMAC), PE router 16C does a lookup in MAC tables 72 using the L2 header information of the L2 multicast frame as a key, without having to snoop on any L3 information of the multicast packet (84). Upon finding a matching entry, PE router 16C replicates the multicast packet as necessary and forwards the L2 multicast frame to one or more ports as indicated by the matching entry (86).

One example technique proposed herein for providing the L3 multicast source address to first-hop router MAC address mapping is to use an out-of-band control packet, such as a new PIM control packet, that includes additional information that provides this mapping. For example, assume source device 24A sends a first multicast packet for a group G1 to router 18A. Router 18A encapsulates the L3 multicast packet as a PIM-register packet and sends it to RP router 14. RP router 14 strips off the PIM-register portion of the packet, and places an L2 header on the L3 multicast packet, wherein the GMAC of the L2 header is derived from the L3 multicast group address (G1) and the SMAC of the L2 header is the MAC address of RP router 14. RP router 14 then forwards the L2 multicast frame (i.e., the L3 multicast packet encapsulated with the L2 header) to PE router 16C. RP router 14 may additionally generate a PIM control packet that includes L3 multicast source address-to-L2 source address mapping information that RP router 14 has determined from the PIM-register packet. RP router 14 may send this PIM control packet to the other PE routers 16, such as by sending the PIM control packet to the ALL-PIM-ROUTERS IP address. This PIM control packet may be a variant of the PIM-register packet.

As PE routers 16 are already capable of snooping on PIM control packets, PE routers 16 will be able to snoop the PIM control packet and obtain the S1-to-SMAC mapping and learn that if an Ethernet multicast packet is received having an L2 header with (SMAC, GMAC), the Ethernet multicast packet should be forwarded to receivers of (S1, G1) multicast traffic. All of PE routers 16 can then update their forwarding information to store the appropriate L2 MAC data to allow PE routers 16 to forward L2 multicast traffic based on the L2 header only. This mechanism would involve a modification to the PIM protocol running on RP router 14 to generate the PIM control packet, and would require that PE router 16C is capable of PIM- or IGMP-snooping and is configured to obtain the required information based on the snooping and update its forwarding information accordingly.

Another example technique proposed herein for providing the L3 multicast source address to first-hop router MAC address mapping is for router 18A to be configured to generate a PIM control packet or IGMP control packet that includes L3 multicast source address-to-L2 source address mapping information in the case where the receiver device 26 is using the shortest-path tree (SPT) for distribution of multicast traffic from the source. In this example, when router 18A receives a new multicast join request from a receiver device 26 that indicates the receiver device wishes to use the SPT for joining the multicast group, router 18A will be triggered to generate the PIM/IGMP control packet for the multicast group and send to PE routers 16. In a similar manner as in the previous example, the PIM/IGMP control packet includes the L3 multicast source address-to-L2 source address mapping information, where the L3 multicast source address is the IP address of source device 24A (i.e., the multicast source connected to router 18A for the group specified in the join message), and the L2 source address is the MAC address of router 18A. Router 18A may send this PIM control packet to PE routers 16, such as by sending the PIM control packet to the ALL-PIM-ROUTERS IP address. This PIM control packet may be a variant of the PIM-register packet. This mechanism would involve a modification to the PIM or IGMP protocol running on router 18A, and would require that PE router 16A is capable of PIM- or IGMP-snooping and is configured to obtain the required information based on the snooping and update its forwarding information accordingly. This technique is suitable when, for example, a receiver device 26 wishes to move from the RPT to the SPT for receiving multicast traffic for a multicast group. This allows PE router 16A to forward subsequent Ethernet multicast packets to interested PE routers in the VPLS domain based only on the L2 header of the Ethernet multicast packets.

Figure 5:
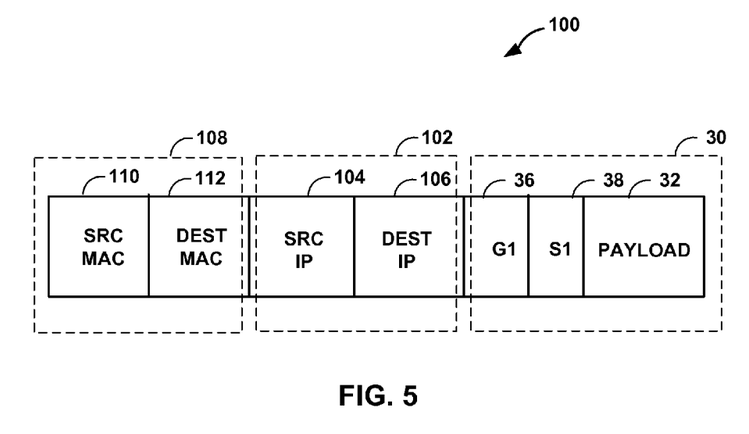
FIG. 5 is a block diagram illustrating an example message format for a PIM-register packet.

FIG. 5 is a block diagram illustrating an example message format for a PIM-register packet 100 sent from router 18A destined for RP router 14. Another example technique proposed herein for providing the mapping between L3 multicast source address and first-hop router MAC address is for PE router 16A to snoop on the PIM-register packet 100 sent by router 18A to PE router 16A destined for RP router 14. When router 18A receives an initial multicast packet from a multicast source (e.g., multicast packet 30 of FIG. 2A), router 18A creates PIM-register packet 100 by encapsulating the multicast packet 30 with an L3 header 102 that includes a source IP address 104 ("SRC IP 104") of router 18A and a destination IP address 106 ("DEST IP 106") of RP router 14, and an L2 header 108 having a source MAC address 110 ("SRC MAC 110") of router 18A and a destination MAC address 112 ("DEST MAC 112") of PE router 16A. By snooping PIM-register packet 100, PE router 16A can discover the destination IP address 106 of the RP router 14, as well as the multicast source IP address 38 for source device 24A. Because PE router 16A will have already snooped on a PIM-hello message from the RP through a VPLS frame and learned the router-MAC address of RP router 14 from this PIM-hello message, PE router 16A can use this information to determine the IP-address-to-router-MAC-address mapping for RP router 14. PE router 16A can then associate the multicast source IP address 38 (S1) of the snooped PIM-register packet 100 with the router-MAC address of RP router 14 for packets received through the RP-rooted shared tree (RPT). This allows PE router 16A to forward subsequent Ethernet multicast packets to interested PE routers in the VPLS domain based only on the L2 header of the Ethernet multicast packets. This will address the case where the RP is not the first-hop-router for the source, which is when PIM-register is in effect. PE router 16B could likewise learn this mapping information by snooping on the PIM-register packet 100 as it is received from PE router 16A and destined for RP router 14.

Another example technique proposed herein for providing the L3 multicast source address to first-hop router MAC address mapping is for routers 18 and RP router 14 to augment PIM-hello messages with a subnet mask that specifies which L3 subnets are behind a receiver or source attached to the router 18 or RP router 14. For example, when router 18A sends a PIM-hello message to the other PIM routers of system 10, router 18A includes additional non-standard information in the PIM-hello message that indicates a subnet mask for source device(s) that are behind router 18A. For example, router 18A may include an IP subnet of 192.16.8.0/24 associated with source device 24A, as well as any other IP subnets of other source devices behind router 18A (other source devices not shown in FIG. 1). PE router 16A receives the augmented PIM-hello message and snoops (i.e., examines) beyond the L2 header of the PIM-hello message into upper layer portions of the PIM-hello message. Because router 18A has included the subnet mask within the PIM-hello messages, during the course of the PIM-hello snooping, PE router 16A becomes aware of the association between the source IP subnet and the MAC address of router 18A, as the MAC address appears in the L2 header of the PIM-hello message as the source MAC address. Once the source IP subnet mask-to-designated-router-MAC address mapping is known, the source IP address of the multicast (S, G) can be directly used to find the designated router-MAC address for the subnet. This allows PE router 16A to forward subsequent Ethernet multicast packets to interested PE routers in the VPLS domain based only on the L2 header of the Ethernet multicast packets. This method may be used for receiving multicast via both the RPT and SPT. Alternatively, instead of including an IP subnet for the source devices, router 18A may individually list source IP addresses, e.g., in type-length-value (TLV) fields of the PIM-hello message.

Another example technique proposed herein for providing the L3 multicast source address to first-hop router MAC address mapping is for a device that is sending a packet for a multicast group (e.g., one of routers 18 or RP router 14) to send a PIM-Source-Specific Multicast (PIM-SSM) message extended to include an additional TLV field that indicates the L2 source address of the first-hop router. PIM-SSM can be used as a multicast routing protocol when every multicast group is associated with only a single source. PIM-SSM builds only SPTs rooted at the source, and bypasses the RP connection stage, because in SSM the router closest to the interested receiver host is informed of the unicast IP address of the source for the multicast traffic. Thus, a VPLS PE router 16 receiving this extended PIM-SSM message can determine the mapping between the IP address of the multicast source and the MAC address of the first-hop router. This allows the PE routers 16 to update their forwarding information to store the appropriate L2 MAC data to allow PE routers 16 to forward L2 multicast traffic in the VPLS domain based on the L2 header only. This mechanism would involve a modification to the PIM-SSM protocol running on a router 18 to generate the modified PIM-SSM control packet, and would require that PE router 16C is capable of PIM-snooping and is configured to obtain the required information based on the snooping and update its forwarding information accordingly.

The examples provided above for providing the L3 multicast source address to first-hop router MAC address mapping are merely exemplary, and other techniques for providing this mapping to the VPLS PE routers may be used in accordance with this disclosure.

Another example technique proposed herein for providing the L3 multicast source address to first-hop router MAC address mapping is for a Multicast Source Discovery Protocol (MSDP) to be modified to send an MSDP packet that includes the router-MAC address. A further example technique would involve creating a new protocol to provide the information about the L3 multicast source address to first-hop router MAC address mapping.

It is possible that more than one L3 multicast addresses will map to the same multicast GMAC, resulting in a GMAC "collision." This situation may be rare for random multicast group addresses. One solution to address this issue may be to send traffic to the union of ports when there is a collision on a GMAC. For example, if multicast traffic destined for multicast groups G1 and G2, arriving in the context of the same VPLS instance, both map to a group MAC address of "GMAC1," then a PE router that forwards the L2 multicast frames based on GMAC1 will not be able to distinguish between traffic for group G1 and traffic for group G2 based only on the GMAC address. One solution to address this issue may be to send traffic to the union of ports when there is a collision on a GMAC. In such a solution, the ports to which to replicate the traffic for GMAC1 could be set in forwarding information as all the ports for G1 and all the ports for G2. The PIM router behind the PE router 16 to which this multicast group is unknown would simply drop the traffic. Any unintended traffic that might reach the receiver devices 26 would be dropped by the filtering mechanism at the receiver devices 26 instead of reaching the upper-layer protocols. That is, when a receiver device such as receiver device 26A receives an L3 multicast packet from router 18B, and the G1 address is not one for which receiver device 26A has any subscribers registered, router 18B does not give the multicast packet to upper-layer protocols.

Another example solution to address the issue of potential GMAC collision is to follow a hybrid model that would use the L3 (S,G) or (*,G) prefix only when there is a collision.

Thus, PE router snooping of multicast join/prune messages would install the GMAC-only route, and this route would be used for forwarding when there is no collision on the GMAC. Later, if there is a collision, as detected through the snooped multicast join/prune messages, the specific MAC route would be updated to point to a next hop that signifies "continue the route lookup in a different FIB"; this would cause the lookup to continue in an IP-route table containing multiple (*, G) and (S, G) routes that alias to the same GMAC. These L3 routes may be set up following an approach of snooping into the L3 portions of multicast packets.

If it is known a priori that there is no possibility of collision in GMACs, then there is no need to extract L3 information from L2 frames in the key buffer for multicast lookup in VPLS. This may be the case, for example, when the multicast group addresses are known in a small multicast setup, or for static groups.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, or other computer-readable storage media. It should be understood that the term "computer-readable storage media" refers to physical storage media, and not signals, carrier waves, or other transient media.

Various embodiments of the invention have been described. These and other embodiments are within the scope of the following claims.

The invention claimed is:

1. A method comprising:
   with a router of a Virtual Private local area network (LAN) Service (VPLS) domain, dynamically learning a mapping between a multicast source device and a Media Access Control (MAC) address of a router that introduces multicast traffic into the VPLS domain from the multicast source device for a multicast group;
   based on the learned mapping, installing a forwarding information entry within the router, wherein the entry specifies a matching prefix that includes the MAC address of a router that introduces the multicast traffic into the VPLS domain from the multicast source device and an L2 multicast group address associated with the multicast group; and
   forwarding received multicast traffic to receivers of the multicast traffic for the multicast group from the router based on a list of ports specified in the forwarding information entry without reference to any layer three (L3) information of the multicast traffic, wherein the received multicast traffic is received as L2 multicast frames having L2 headers.

2. The method of claim 1, wherein dynamically learning the mapping comprises dynamically learning a mapping between a unicast L3 address of the multicast source device and the MAC address of the router that introduces the multicast traffic into the VPLS domain from the multicast source device.

3. The method of claim 2, wherein dynamically learning the mapping comprises dynamically learning a mapping between a unicast Internet Protocol (IP) address of the multicast source device and the MAC address of the router that introduces into the VPLS domain multicast traffic from the multicast source device.

4. The method of claim 1, wherein the forwarding information specifies one or more ports of the router of the VPLS domain on which to send multicast traffic that matches the MAC address of the router and the L2 multicast group address.

5. The method of claim 1, further comprising:
   receiving an L3 multicast signaling packet, wherein the L3 multicast signaling packet indicates the mapping between the multicast source device and the Currently Amended address of the router that introduces into the VPLS domain multicast traffic from the multicast source device,
   wherein dynamically learning the mapping comprises dynamically learning the mapping based on inspection of the L3 portions of the L3 multicast signaling packet.

6. The method of claim 5, wherein receiving the L3 multicast signaling packet comprises receiving a Protocol Independent Multicast (PIM) control packet that indicates the mapping.

7. The method of claim 6, wherein receiving the PIM control packet comprises receiving the PIM control packet from a Rendezvous Point (RP) router, wherein the RP router generates the PIM control packet in response to receiving a PIM-register packet that contains multicast traffic from the multicast source device.

8. The method of claim 6, wherein receiving the PIM control packet comprises receiving the PIM control packet from the router when the router receives a multicast join request from a receiver device that indicates the receiver device requests to receive multicast traffic from the multicast source device via a shortest-path tree.

9. The method of claim 5, wherein receiving the L3 multicast signaling packet comprises receiving a Protocol Independent Multicast Source-Specific Multicast (PIM-SSM) packet that indicates the mapping.

10. The method of claim 1, further comprising:
    with the router of the VPLS domain, receiving a Protocol Independent Multicast (PIM)-register packet from the router destined for a Rendezvous Point (RP) router;
    determining a IP address of the RP router based on a destination IP address of the PIM-register packet;
    with the router of the VPLS domain, receiving a PIM-hello packet from the RP router;
    based on the IP address of the RP router and the PIM-hello packet, determining a Media Access Control (MAC) address of the RP router from the PIM-hello packet;
    wherein dynamically learning the mapping comprises learning the mapping between the multicast source device specified in the PIM-hello packet and the MAC address of the RP router based on the PIM-register packet and the PIM-hello packet.

11. The method of claim 1, further comprising receiving an L3 multicast control packet that includes an L3 subnet mask indicating an L3 subnet of the multicast source device positioned behind a router sending the L3 multicast control packet.

12. The method of claim 11, wherein receiving the L3 multicast control packet comprises receiving a Protocol Independent Multicast (PIM)-hello packet.

13. A router comprising:
    a Virtual Private local area network (LAN) Service (VPLS) module that dynamically learns a mapping between a multicast source device and a Media Access Control (MAC) address of a router that introduces multicast traffic into the VPLS domain from the multicast source device;
    a forwarding engine that, based on the learned mapping, installs a forwarding information entry, wherein the entry specifies a matching prefix that includes the MAC address of the router that introduces the multicast traffic into the VPLS domain from the multicast source device, and a layer two (L2) multicast group address associated with the multicast group, and forwards received multicast traffic to receivers of the multicast traffic for the multicast group based on a list of ports specified in the forwarding information entry without reference to any layer three (L3) information of the multicast traffic, wherein the received multicast traffic is received as L2 multicast frames having L2 headers.

14. The router of claim 13, wherein the VPLS module dynamically learns a mapping between a unicast L3 address of the multicast source device and the MAC address of the router that introduces the multicast traffic into the VPLS domain from the multicast source device.

15. The router of claim 14, wherein the VPLS module dynamically learns a mapping between a unicast Internet Protocol (IP) address of the multicast source device and the MAC address of the router that introduces into the VPLS domain multicast traffic from the multicast source device.

16. The router of claim 13, wherein the forwarding information specifies one or more ports of the router of the VPLS domain on which to send multicast traffic that matches the MAC address of the router that introduces the multicast traffic into the VPLS domain and the L2 multicast group address.

17. The router of claim 13, further comprising:
    an interface that receives an L3 multicast signaling packet, wherein the L3 multicast signaling packet indicates the mapping between the multicast source device and the MAC address of the router that introduces into the VPLS domain multicast traffic from the multicast source device, wherein the VPLS module dynamically learns the mapping based on inspection of the L3 portions of the L3 multicast signaling packet.

18. The router of claim 17, wherein the L3 multicast signaling packet comprises a Protocol Independent Multicast (PIM) control packet that indicates the mapping.

19. The router of claim 17, wherein the L3 multicast signaling packet comprises a Protocol Independent Multicast Source-Specific Multicast (PIM-SSM) packet that indicates the mapping.

20. The router of claim 13, further comprising an interface that receives an L3 multicast control packet that includes an L3 subnet mask indicating an L3 subnet of the multicast source device positioned behind a router sending the L3 multicast control packet.

21. The router of claim 20, wherein the L3 multicast control packet comprises a Protocol Independent Multicast (PIM)-hello packet.

22. The router of claim 13, further comprising an interface that receives a Protocol Independent Multicast (PIM)-register packet destined for a Rendezvous Point (RP) router, and receives a PIM-hello packet from the RP router, wherein the VPLS module determines an IP address of the RP router based on a destination IP address of the PIM-register packet, wherein the VPLS module determines, based on the IP address of the RP router and the PIM-hello packet, a Media Access Control (MAC) address of the RP router from the PIM-hello packet, and wherein the VPLS module dynamically learns the mapping between the multicast source device specified in the PIM-hello packet and the MAC address of the RP router based on the PIM-register packet and the PIM-hello packet.

23. A non-transitory computer-readable storage medium comprising instructions for causing a programmable processor to:

dynamically learn a mapping between a multicast source device and a Media Access Control (MAC) address of a router that introduces into a Virtual Private local area network (LAN) Service (VPLS) domain multicast traffic from the multicast source device;

install a forwarding information entry based on the learned mapping, wherein the entry specifies a matching prefix that includes the MAC address of the router that introduces multicast traffic into the VPLS domain from the multicast source device and an L2 multicast group address associated with the multicast traffic; and forward received multicast traffic destined for the L2 multicast group address based on a list of ports specified in the forwarding information entry without reference to any layer three (L3) information of the multicast traffic, wherein the received multicast traffic is received as L2 multicast frames having L2 headers.

24. The non-transitory computer-readable storage medium of claim 23, wherein the instructions for causing the processor to dynamically learn the mapping comprise instructions to dynamically learn a mapping between a unicast L3 address of the multicast source device and the MAC address of the router that introduces into the VPLS domain multicast traffic from the multicast source device.

25. The method of claim 1, wherein installing the forwarding information entry within the router comprises installing the entry in a MAC table maintained by the router.

* * * * *